(12) United States Patent
Kim

(10) Patent No.: US 9,411,204 B2
(45) Date of Patent: Aug. 9, 2016

(54) LIQUID CRYSTAL DISPLAY DEVICE

(71) Applicant: Seo Yeon Kim, Yongin (KR)

(72) Inventor: Seo Yeon Kim, Yongin (KR)

(73) Assignee: SAMSUNG DISPLAY CO., LTD., Yongin, Gyunggi-do (KR)

( * ) Notice: Subject to any disclaimer, the term of this patent is extended or adjusted under 35 U.S.C. 154(b) by 95 days.

(21) Appl. No.: 13/929,915

(22) Filed: Jun. 28, 2013

(65) Prior Publication Data

US 2014/0125903 A1    May 8, 2014

(30) Foreign Application Priority Data

Nov. 6, 2012   (KR) .................. 10-2012-0124975

(51) Int. Cl.
*G02F 1/1333* (2006.01)
*G02F 1/1362* (2006.01)

(52) U.S. Cl.
CPC .............. *G02F 1/136204* (2013.01); *G02F 2001/133317* (2013.01)

(58) Field of Classification Search
None
See application file for complete search history.

(56) References Cited

U.S. PATENT DOCUMENTS

| | | | | |
|---|---|---|---|---|
| 6,992,736 B2* | 1/2006 | Saito et al. | ...................... | 349/58 |
| 7,471,353 B2* | 12/2008 | Oohira | .............. | 349/58 |
| 7,936,414 B2* | 5/2011 | Hsiao et al. | ..................... | 349/58 |
| 2009/0067112 A1* | 3/2009 | Takabayashi | ................. | 361/220 |
| 2011/0164196 A1* | 7/2011 | Fukayama et al. | .............. | 349/43 |
| 2011/0310324 A1* | 12/2011 | Jang et al. | ........................ | 349/58 |
| 2012/0206680 A1* | 8/2012 | Onishi | .......................... | 349/122 |

FOREIGN PATENT DOCUMENTS

| KR | 10 2007-0052502 A | 5/2007 |
|---|---|---|
| KR | 10 2008-0035784 A | 4/2008 |
| KR | 10 2008-0060034 A | 7/2008 |
| KR | 10 2011-0074120 A | 6/2011 |

* cited by examiner

*Primary Examiner* — Dung Nguyen
*Assistant Examiner* — Shan Liu
(74) *Attorney, Agent, or Firm* — Lee & Morse, P.C.

(57) ABSTRACT

A liquid crystal display device includes a liquid crystal panel including a thin film transistor substrate and a color filter substrate that face each other, a guide member adjacent to a first side surface of the liquid crystal panel, and conductive dots connected to the thin film transistor substrate, the color filter substrate, and the guide member.

9 Claims, 9 Drawing Sheets

LIQUID CRYSTAL DISPLAY DEVICE

CROSS-REFERENCE TO RELATED APPLICATION

This application is based on and claims priority from Korean Patent Application No. 10-2012-0124975, filed on Nov. 6, 2012, in the Korean Intellectual Property Office, the disclosure of which is incorporated herein in its entirety by reference.

BACKGROUND

1. Field

Example embodiments relate to a liquid crystal display device, and more particularly, to a liquid crystal display device, which can prevent deterioration of display quality due to static electricity.

2. Description of the Related Art

A liquid crystal display device includes a liquid crystal layer disposed between a thin film transistor substrate and a color filter substrate, and displays an image by controlling the light passing through the liquid crystal layer. The thin film transistor substrate includes thin film transistors and pixel electrodes connected to the thin film transistors. In the liquid crystal display device, the light passing through the liquid crystal layer may be controlled by controlling the arrangement of liquid crystal particles included in the liquid crystal layer, e.g., by controlling voltage applied to the pixel electrodes via the thin film transistors.

The liquid crystal display device may further include common electrodes. An electric field may be formed between the common electrode and the pixel electrode, so the arrangement of the liquid crystal particles may be controlled by the electric field. The common electrode may be disposed on the thin film transistor substrate or the color filter substrate depending on the type of the light crystal display devices. For example, if the liquid crystal display device is a horizontal electric field type liquid crystal display device, the common electrode may be disposed on the thin film transistor substrate. In another example, if the liquid crystal display device is a vertical electric field type liquid crystal display device, the common electrode may be disposed on the color filter substrate.

SUMMARY

Example embodiments provide a liquid crystal display device which can prevent deterioration of display quality due to static electricity on a color filter substrate.

Example embodiments also provide a liquid crystal display device with a simplified fabricating process.

Example embodiments also provide a liquid crystal display device with decreased product inferiority rate.

According to an embodiment, there is provided a liquid crystal display device including a liquid crystal panel including a thin film transistor substrate and a color filter substrate that face each other, a guide member adjacent to a first side surface of the liquid crystal panel, and conductive dots connected to the thin film transistor substrate, the color filter substrate, and the guide member.

A side surface of the thin film transistor substrate and a side surface of the color filter substrate may be coplanar and define the first side surface of the liquid crystal panel, the first side surface of the liquid crystal panel facing the guide member.

The thin film transistor substrate and the color filter substrate may be connected to the conductive dots in a region adjacent to a short side of the first side surface.

The guide member may include a first surface, the first surface of the guide member facing the first side surface of the liquid crystal panel.

The short side the first side surface of the liquid crystal panel may include a first short side and a second short side opposite each other, and the guide member may further include a first projection portion adjacent to the first short side, the first projection portion projecting from the first surface of the guide member to the first side surface of the liquid crystal panel.

The guide member may further include a second projection portion adjacent to the second short side, the second projection portion projecting from the first surface of the guide member to the first side surface of the liquid crystal panel.

The first side surface of the liquid crystal panel may further include a second side surface connected to the first side surface by the first short side, and the guide member may further include a second surface connected to the first surface and faces the second side surface.

The guide member may further include a third projection portion adjacent to the first short side of the first side surface, the third projection portion projecting from the second surface of the guide member to the second side surface of the liquid crystal display device.

The first side surface of the liquid crystal panel may further include a third side surface connected to the first side surface by the second short side, and the guide member may further include a third surface connected to the first surface of the guide member and faces the third side surface.

The guide member may further include a fourth projection portion adjacent to the second short side and projects from the third surface to the third side surface.

A voltage source may be configured to apply a common voltage to the thin film transistor substrate, the thin film transistor substrate including a common voltage wiring exposed to the outside through the first side surface of the liquid crystal display panel, the color filter substrate may include a color filter layer and a conductive layer connected to the color filter layer, and the common voltage wiring and the conductive layer may be in contact with the conductive dots.

The liquid crystal display device may further include a backlight unit on a lower portion of the liquid crystal panel, the guide member contacting the backlight unit.

The liquid crystal display device may further include a backlight unit on a lower portion of the liquid crystal panel, the guide member being integral with the backlight unit.

According to an embodiment, there is provided a liquid crystal display device including a liquid crystal panel including a thin film transistor substrate and a color filter substrate facing each other, a first guide member adjacent to a first short side of a first side surface of the liquid crystal panel, and first conductive dots connected to the thin film transistor substrate, the color filter substrate, and the first guide member.

The liquid crystal panel may further include a second side surface connected to the first side surface by the first short side, the first guide member having a first surface that faces the first side surface, and a second surface that faces the second side surface.

The first guide member may further include a first projection portion which is adjacent to the first short side and projects from the first surface to the first side surface, and a second projection portion which is adjacent to the first short side and projects from the second surface to the second side surface.

The liquid crystal display device may further include a second guide member disposed to be adjacent to the second short side, and second conductive dots connected to the thin film transistor substrate, the color filter substrate, and the second guide member.

The first side surface may further include a second short side that faces the first short side, the liquid crystal panel may further include a third side surface that is connected to the first side surface by the second short side, and the second guide member may include a third surface that faces the first side surface, and a fourth surface that faces the third side surface.

A side surface of the thin film transistor substrate and a side surface of the color filter substrate may be arranged on a same plane on the first side surface of the liquid crystal panel that faces the first guide member.

A voltage source may be configured to apply a common voltage to the thin film transistor substrate, the thin film transistor substrate including a common voltage wiring exposed to the outside through the first side surface of the liquid crystal display panel, the color filter substrate may include a color filter layer and a conductive layer connected to the color filter layer, and the common voltage wiring and the conductive layer may be in contact with the first conductive dots.

BRIEF DESCRIPTION OF THE DRAWINGS

The above and other features will be more apparent from the following detailed description taken in conjunction with the accompanying drawings, in which.

DETAILED DESCRIPTION

Figure 1:
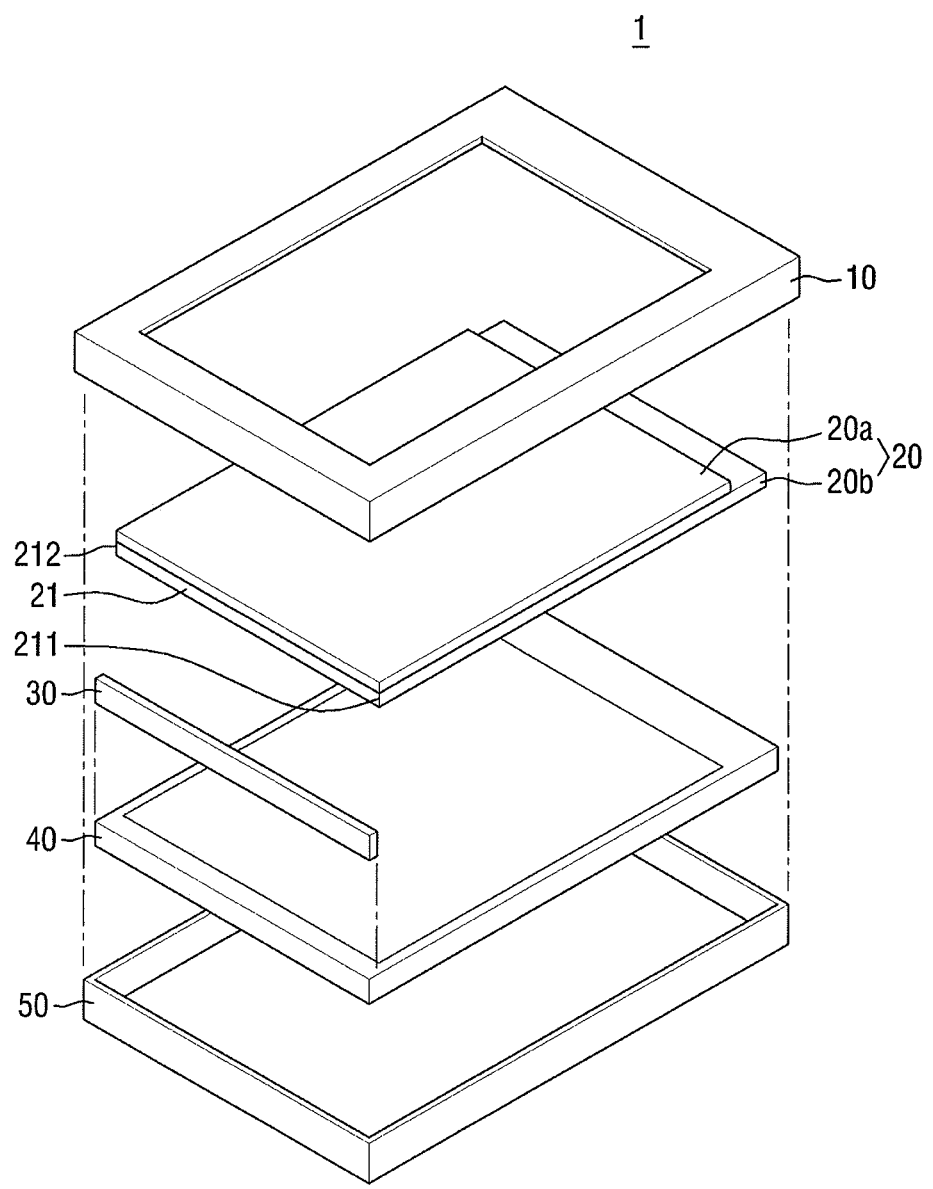
FIG. 1 is an exploded perspective view of a liquid crystal display device according to an embodiment.

Advantages and features of example embodiments and methods of accomplishing the same may be understood more readily by reference to the following detailed description of preferred embodiments and the accompanying drawings. The example embodiments may, however, be embodied in many different forms and should not be construed as being limited to the embodiments set forth herein. Rather, these embodiments are provided so that this disclosure will be thorough and complete and will fully convey the inventive concept to those skilled in the art, and the example embodiments will only be defined by the appended claims. Thus, in some embodiments, well-known structures and devices are not shown in order not to obscure the description of the invention with unnecessary detail. Like reference numerals refer to like elements throughout. In the drawings, the thickness of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the example embodiments.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Hereinafter, embodiments will be described in detail with reference to the accompanying drawings.

FIG. 1 is an exploded perspective view of a liquid crystal display device according to an embodiment.

Referring to FIG. 1, a liquid crystal display device 1 includes a liquid crystal panel 20, a guide member 30, and conductive dots (not illustrated).

The liquid crystal panel 20 may include a color filter substrate 20a, a thin film transistor substrate 20b, and a liquid crystal layer disposed between the color filter substrate 20a and the thin film transistor substrate 20b.

The color filter substrate 20a may be disposed to face the thin film transistor substrate 20b. If the liquid crystal display device 1 is driven in a horizontal electric field type, a common electrode may not be disposed on the color filter substrate 20a. The color filter substrate 20a may be connected to the thin film transistor substrate 20b by the conductive dots to be described later. The conductive dots may connect the color filter substrate 20a and the thin film transistor substrate 20b to each other, and may provide a path for discharging static electricity generated on the color filter substrate 20a, thereby preventing deterioration of display quality due to the static electricity.

The thin film transistor substrate 20b includes thin film transistors. The thin film transistors may be controlled to adjust the light passing through the liquid crystal layer, so an image can be displayed on the liquid crystal panel 20 of the liquid crystal display device. The details of the liquid crystal panel 20 will be described below with reference to FIG. 4.

The guide member 30 may be disposed to be adjacent to a first side surface 21 of the liquid crystal panel 20. The first side surface 21 of the liquid crystal panel 20 may be defined by side surfaces of the color filter substrate 20a and the thin film transistor substrate 20b, i.e., the side surfaces of the color filter substrate 20a and the thin film transistor substrate 20b may be disposed on a same plane.

The guide member 30 and the conductive dots connecting the color filter substrate 20a and the thin film transistor substrate 20b may provide a simplified connection between the substrates of the liquid crystal display device 1. That is, when the liquid crystal panel 20 is adjacent to the guide member 30, after coating the surface of the guide member 30 that faces the first side surface 21 of the liquid crystal panel 20 with the conductive dots, the conductive dots contact the first side surface 21 of the liquid crystal panel 20 and an upper surface of the liquid crystal panel 20 by pressure that acts between the guide member 30 and the liquid crystal panel 20. Accordingly, the conductive dots can connect the thin film transistor substrate 20b and the color filter substrate 20a to each other. According to example embodiments, a separate process of attaching the conductive dots to the liquid crystal panel 20 is not necessary during fabrication of the liquid crystal display device 1, as will be described in more detail below.

The liquid crystal display device 1 may further include an upper cover 10, a backlight unit 40, and a lower cover 50.

The upper cover 10 may form an upper outline of the liquid crystal display device 1. The upper cover 10 may be disposed on the liquid crystal panel 20. The upper cover 10 may include an opening that exposes at least a part of the liquid crystal panel 20.

The backlight unit 40 may be disposed on a lower portion of the liquid crystal panel 20, e.g., the liquid crystal panel 20 may be between the backlight unit 40 and the upper cover 10. The backlight unit 40 may provide light to the liquid crystal panel 20, so passage of light from the backlight unit 40 through the liquid crystal in the liquid crystal panel 20 is controlled to display an image on the liquid crystal panel 20.

The lower cover 50 may be formed on a lower outline of the liquid crystal display device 1. Between the lower cover 50 and the upper cover 10, the liquid crystal panel 20, the guide member 30, and the backlight unit 40 may be accommodated.

Figure 2:
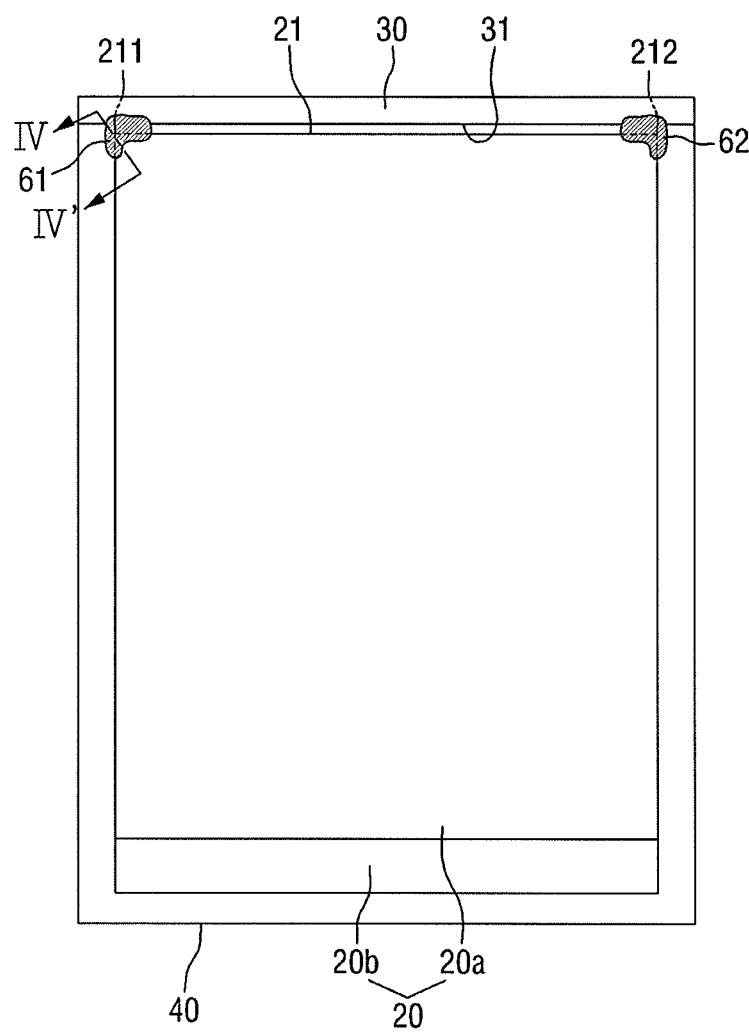
FIG. 2 is a plan view illustrating a liquid crystal panel, a guide member, a backlight unit, and conductive dots in a combined state according to an embodiment.

Hereinafter, referring to FIGS. 2 and 3, connection of the color filter substrate 20a and the thin film transistor substrate 20b through the conductive dots will be described in detail. FIG. 2 is a plan view illustrating the liquid crystal panel 20, the guide member 30, the backlight unit 40, and the conductive dots in a combined state according to example embodiments, and FIG. 3 is a side view of the liquid crystal panel 20, guide member 30, backlight unit 40, and conductive dots in a combined state.

Figure 3:
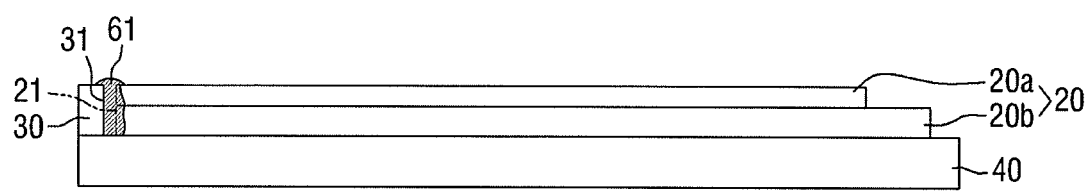
FIG. 3 is a side view illustrating a liquid crystal panel, a guide member, a backlight unit, and conductive dots in a combined state according to an embodiment.

Referring to FIG. 3, the guide member 30 may be seated on the backlight unit 40. The guide member 30 may be attached to the backlight unit 40. For example, the guide member 30 may be attached to the backlight unit 40 by adhesives or in a mechanical manner. In some embodiments, the guide member 30 may be integrally formed with the backlight unit 40. Further, in some embodiments, the guide member 30 may be attached to a configuration that is included in the liquid crystal display device 1, except for the backlight unit 40, or may be integrally formed with the above-described configuration. For example, the guide member 30 may be attached to the lower cover 50 or to the upper cover 10, or may be integrally formed with the lower cover 50 or the upper cover 10. Further, although not illustrated, if the liquid crystal display device 1 includes a mold frame between the backlight unit 40 and the liquid crystal panel 20, the guide member 30 may be attached to the mold frame or may be integrally formed with the mold frame.

Referring to FIGS. 1-2, the guide member 30 may include a first surface 31 that faces the first side surface 21 of the liquid crystal panel 20. The first side surface 21 may include a first short side 211 and a second short side 212 opposite the first short side 211. The first side surface 21 may be formed to extend at least from the first short side 211 to the second short side 212, i.e., a length of the first side surface 21 may be defined between the first and second short sides 211 and 212. A height of the first side surface 21 may be substantially equal to a length of each of the first and second short sides 211 and 212.

Referring back to FIG. 3, the liquid crystal panel 20 may be seated on the backlight unit 40. The liquid crystal panel 20 is arranged so that the first side surface 21 comes in contact with the first surface 31 of the guide member 30, and the liquid crystal panel 20 can be connected to the guide member 30. In detail, the liquid crystal panel 20 may be connected to the guide member 30 through conductive dots 61 and 62. For example, the liquid crystal panel 20 may be moved so that the first side surface 21 is adjacent to the first surface 31 of the guide member 30, and each of the conductive dots 61 and 62 coated on the guide member 30, e.g., directly, contacts the first side surface 21. For example, when each of the conductive dots 61 and 62 directly contact the first surface 31 and the first side surface 21, the liquid crystal panel 20 is connected to the guide member 30 via the conductive dots 61 and 62.

Further, by the pressure between the guide member 30 and the liquid crystal panel 20, the conductive dots 61 and 62 are spread along the first side surface onto an upper surface of the liquid crystal panel 20, e.g., each of the conductive dots 61 and 62 may contact the backlight unit 40 to extend from the backlight unit 40 along the first side surface 21 to the upper surface of the liquid crystal panel 20. Therefore, the conductive dots 61 and 62 and the liquid crystal panel 20 can be connected to each other on the upper surface of the liquid crystal panel 20. Since the liquid crystal display device 1 is formed through a process of combining the conductive dots 61 and 62 with the liquid crystal panel 20 after coating the guide member 30 with the conductive dots 61 and 62, a process of attaching the conductive dots 61 and 62 to the liquid crystal panel 20 can be easily performed. Further, since the guide member 30 protects the outline of the conductive dots 61 and 62 attached to the liquid crystal panel 20 and prevents peeling-off of the conductive dots 61 and 62, poor structure or performance of the liquid crystal display device 1 due to the peeling-off of the conductive dots 61 and 62 can be decreased.

The conductive dots 61 and 62 coated on the guide member 30 may be a liquid conductive material having a predetermined viscosity. The conductive dots 61 and 62 may be formed of carbon or silver (Ag), but are not limited thereto. The conductive dots 61 and 62 may be hardened over time, e.g., a predetermined time after the conductive dots 61 and 62 are connected to the liquid crystal panel 20. The hardened conductive dots 61 and 62 may attach, e.g., connect, the liquid crystal panel 20 and the guide member 30 to each other.

The conductive dots 61 and 62 may be disposed to be adjacent to the first short side 211 and the second short side 212, respectively. For example, the conductive dots 61 and 62 may be disposed to cover the first short side 211 and/or the second short side 212, e.g., the conductive dots 61 and 62 may include the first conductive dot 61 that is adjacent to the first short side 211 and the second conductive dot 62 that is adjacent to the second short side 212. In some embodiments, the liquid crystal display device 1 may include only one of the first conductive dot 61 and the second conductive dot 62. Further, in some embodiments, the liquid crystal display device may include additional conductive dots in addition to the first and second conductive dots 61 and 62.

Figure 4:
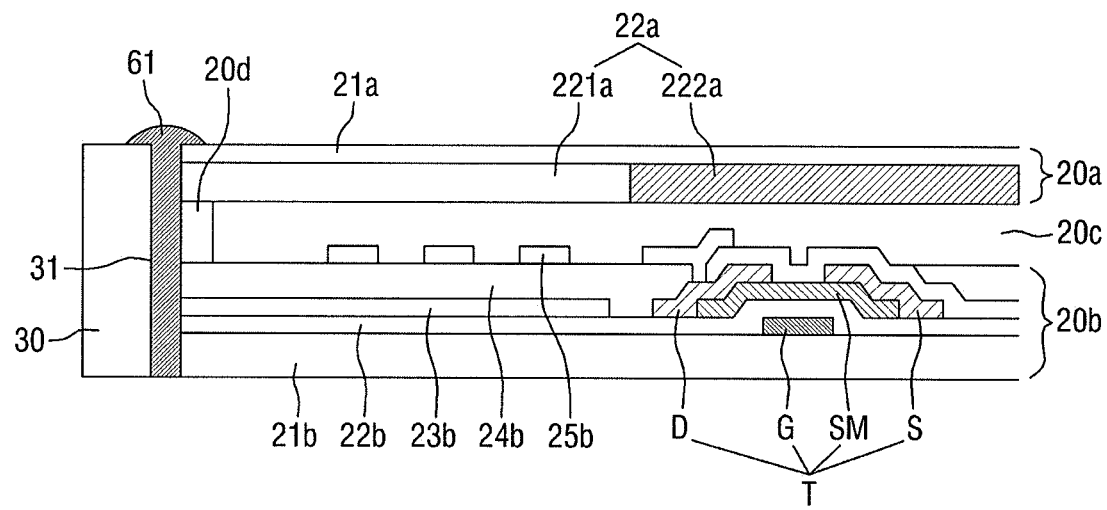
FIG. 4 is a cross-sectional view illustrating a liquid crystal panel, a guide member, and conductive dots taken along ling IV-IV' in FIG. 2.

Hereinafter, referring to FIG. 4, the connection between the conductive dots 61 and 62 and the liquid crystal panel 20 will be described in more detail. FIG. 4 is a cross-sectional view along ling IV-IV' in FIG. 2.

Referring to FIG. 4, the thin film transistor substrate 20b may include a base 21b, a gate insulating film 22b, a common electrode 23b, a planarization film 24b, a pixel electrode 25b, a gate electrode G, a semiconductor layer SM, a source electrode S, and a drain electrode D.

The base 21b may be formed of an insulating material. For example, the base 21b may be formed of glass, quartz, or plastic. The base 21b may be in a flat plate shape. In some embodiments, the base 21b may be formed of a material that can be easily bent by an external force. The base 21b may support other configurations disposed on the base 21b.

On the base 21b, the gate electrode G may be disposed. The gate electrode G may be disposed to overlap at least a part of the semiconductor layer SM. By a voltage that is applied to the gate electrode G, it may be controlled whether or not the semiconductor layer SM becomes conductive. For example, if a relatively high voltage is applied to the gate electrode G, the semiconductor layer SM becomes conductive, and thus the drain electrode D and the source electrode S are electrically connected to each other. If a relatively low voltage is applied to the gate electrode G, the semiconductor layer SM becomes non-conductive, and the drain electrode D and the source electrode S are insulated from each other.

On the gate electrode G, the gate insulating film 22b may be disposed. The gate insulating film 22b may insulate the gate electrode G from the semiconductor layer SM. The gate insulating film 22b may be formed of, e.g., silicon nitride ($SiN_x$) or silicon oxide ($SiO_2$), but is not limited thereto.

The semiconductor layer SM may be disposed on the gate insulating film 22b. The semiconductor layer SM may be formed to overlap at least a part of the gate electrode G. The semiconductor layer SM may be formed of an amorphous silicon film or a polycrystalline silicon film. The semiconductor layer SM may include a channel region that is not doped with impurities, a source region and a drain region, which are disposed on both sides of the channel region, e.g., p+-doped, and are in contact with the source electrode S and the drain electrode D, respectively. The impurities doped in the semiconductor layer SM may be P-type impurities, e.g., boron (B), $B_2H_6$, or the like. The impurities doped in the semiconductor layer SM may be variously changed according to the embodiments. In some embodiments, the semiconductor layer SM may be formed of an oxide semiconductor.

The source electrode S and the drain electrode D may be disposed on the semiconductor layer SM. At least parts of the source electrode S and the drain electrode D may contact the semiconductor layer SM.

The source electrode S, the drain electrode D, the gate electrode G, and the semiconductor layer SM may form a thin film transistor T, and the thin film transistor T may determine whether to transfer a signal to from the source electrode S to the drain electrode D depending on the voltage applied to the gate electrode G.

The planarization film 24b may be disposed on the thin film transistor T. The planarization film 24b may serve to remove a stepped portion on an upper portion of the thin film transistor T and to form a planarized surface for easy arrangement of the pixel electrode 25b disposed on the upper portion of the planarization film 24b. A contact hole may be formed on the planarization film 24b, and the pixel electrode 25b contacts the drain electrode D through the contact hole to be electrically connected to the drain electrode D.

On the planarization film 24b, the pixel electrode 25b may be disposed. The pixel electrode 25b may be formed of a transparent conductive material. For example, the pixel electrode 25b may be formed of ITO (Indium Tin Oxide) or IZO (Indium Zinc Oxide). However, the material of the pixel electrode 25b is not limited thereto. The pixel electrode 25b forms an electric field between the common electrode 23b and the pixel electrode 25b in response to the signal applied from the drain electrode D, and by this electric field, the arrangement of the liquid crystal particles (not illustrated) included in a liquid crystal layer 20c may be controlled. In FIG. 4, the pixel electrode 25b is shown as discontinuous portions. However, the discontinuous portions may be actually connected to each other and may be electrically connected to the drain electrode D as a whole.

The common electrode 23b may be disposed below the pixel electrode 25b to be insulated from the pixel electrode 25b, e.g., the planarization film 24b may be between the common electrode 23b and the pixel electrode 25b. Since the thin film transistor substrate 20b includes the common electrode 23b, the liquid crystal panel 20 may operate in the horizontal electric field type. The common voltage may be applied to the common electrode 23b. At least a part of the common electrode 23b may be exposed to the side surface of the liquid crystal panel 20. The common electrode 23b may be connected to the first conductive dot 61 in the region that is exposed toward the side surface of the liquid crystal panel 20, e.g., an edge of the common electrode 23b may be coplanar with the first side surface 21 of the liquid crystal panel 20 to contact the first conductive dot 61. Although not illustrated, in the region where the second conductive dot 62 is disposed, the common electrode 23b may be connected to the second conductive dot 62 in the region that is exposed toward the side surface of the liquid crystal panel 20. As the common electrode 23b is electrically connected to at least one of the conductive dots 61 and 62, the common voltage may be applied by the common electrode 23b to the conductive dots 61 and 62, thereby transferring the common voltage to the color filter substrate 20a via the conductive dots 61 and 62.

The color filter substrate 20a may include a color filter layer 22a and a conductive layer 21a. The color filter layer 22a may include a color filter region 221a and a black matrix region 222a. In the color filter region 221a, red, green, or blue color filter may be disposed. In the black matrix region 222a, black matrices may be disposed to shield the light. The conductive layer 21a may be disposed on the color filter layer 22a. The conductive layer 21a may be formed of a transparent conductive material, e.g., ITO or IZO, but is not limited thereto.

The conductive layer 21a may be connected to the first conductive dot 61 on the side surface and the upper surface thereof, e.g., the first conductive dot 61 may directly contact a side surface and an upper surface of the conductive layer 21a. Although not illustrated, in the region where the second conductive dot 62 is disposed, the conductive layer 21a may be connected to the second conductive dot 62 on the side surface and the upper surface thereof. The conductive layer 21a may be connected to the conductive dots 61 and 62 to discharge the static electricity that is generated on the color filter substrate 20a through the conductive dots 61 and 62. Since the common voltage is applied to the conductive layer 21a through the conductive dots 61 and 62, the conductive layer 21a serves to maintain the electric potential of the color filter substrate 20a constant. Accordingly, the conductive layer 21a may prevent the static electricity generated on the color filter substrate 20a from exerting an influence on the liquid crystal layer 20c, and may prevent an electric field outside the liquid crystal panel 20 from exerting an influence on the liquid crystal layer 20c. Accordingly, deterioration of the display quality of the liquid crystal display device 1, e.g., due to the static electricity generated on the color filter substrate 20a and the external electric field, can be prevented or substantially minimized.

The liquid crystal panel 20 may further include a sealing pattern 20d. The sealing pattern 20d may prevent the liquid crystal layer 20c disposed between the color filter substrate 20a and the thin film transistor substrate 20b from leaking to the outside.

Figure 5:
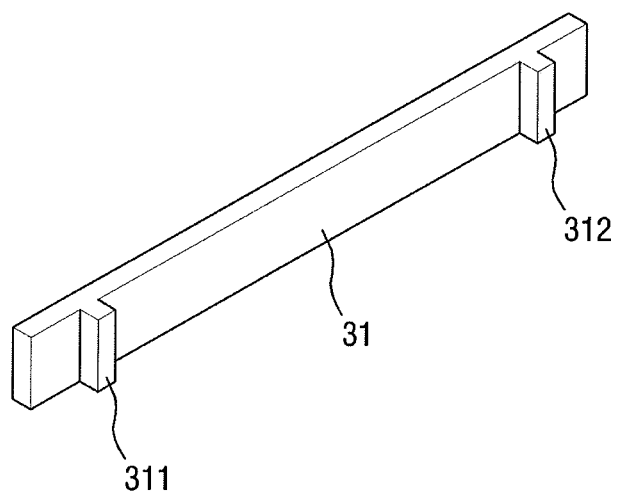
FIG. 5 is a perspective view of a guide member according to another embodiment.

Hereinafter, referring to FIGS. 5 and 6, another embodiment will be described. FIG. 5 is a perspective view of a guide member according to another embodiment, and FIG. 6 is a plan view illustrating a liquid crystal panel, a guide member, a backlight unit, and conductive dots in a combined state according to the other embodiment.

Referring to FIG. 5, a guide member 30a may be similar to the guide member 30 described previously with reference to FIGS. 1-4, and may further include a first projection portion 311 and a second projection portion 312 on the first surface 31. The first projection portion 311 and the second projection portion 312 may project in the direction of, i.e., toward, the first side surface 21 of the liquid crystal panel 20.

Figure 6:
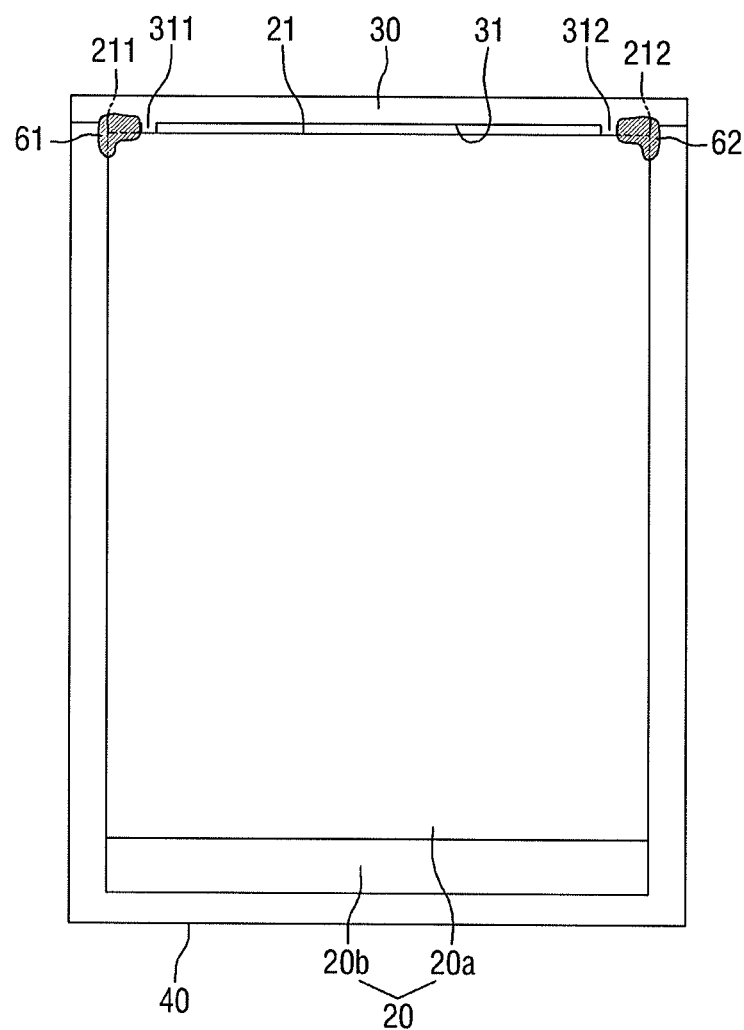
FIG. 6 is a plan view illustrating a liquid crystal panel, a guide member, a backlight unit, and conductive dots in a combined state according to another embodiment.

Referring to FIG. 6, the first projection portion 311 may be disposed to be adjacent to the first short side 211 and the second projection portion 312 may be disposed to be adjacent to the second short side 212. The first conductive dot 61 may be disposed from the first projection portion 311 toward the edge that is adjacent to the first short side 211 of the first surface 31, and may be combined with the liquid crystal panel 20. The second conductive dot 62 may be disposed from the second projection portion 312 toward the edge that is adjacent to the second short side 212 of the first surface 31, and may be combined with the liquid crystal panel 20. The first projection portion 311 and the second projection portion 312 may prevent the conductive dots 61 and 62 disposed on the edges from infiltrating, e.g., spreading, into the inside of the first side surface 21 in the process of combining the conductive dots 61 and 62 with the liquid crystal panel 20.

In detail, in addition to the common electrode 23b and the conductive layer 21a, a wiring transferring an additional signal may be exposed from the side surface of the liquid crystal panel 20. If the conductive dots 61 and 62 extend to a region that exceeds the expected region of the first side surface 21, e.g., contact a center of the first side surface 21a, the wiring in the liquid crystal panel 20 may be short-circuited. Accordingly, the first projection portion 311 and the second projection portion 312 can prevent excessive extension of the conductive dots 61 and 62, e.g., toward the center of the first side surface 21, thereby decreasing a potential for a short-circuit caused by the conductive dots 61 and 62 of the liquid crystal panel 20. In some embodiments, one of the first projection portion 311 and the second projection portion 312 may be omitted.

Figure 7:
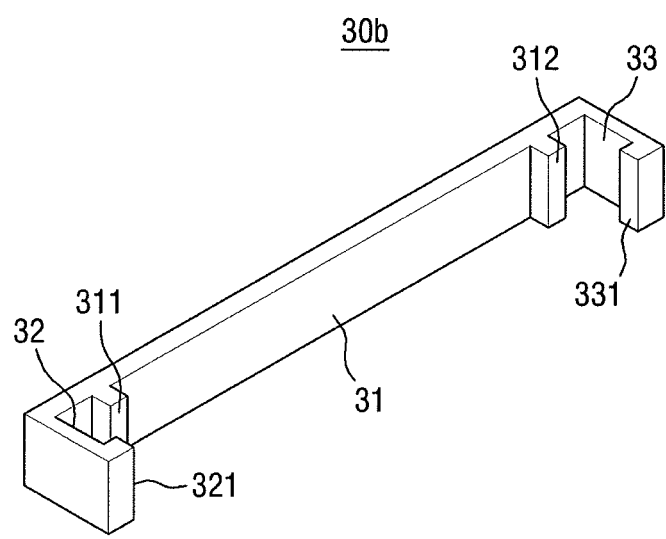
FIG. 7 is a perspective view of a guide member according to still another embodiment.

Hereinafter, referring to FIGS. 7 and 8, still another embodiment will be described. FIG. 7 is a perspective view of a guide member according to still another embodiment, and FIG. 8 is a plan view illustrating a liquid crystal panel, a guide member, a backlight unit, and conductive dots in a combined state according to the other embodiment.

Figure 8:
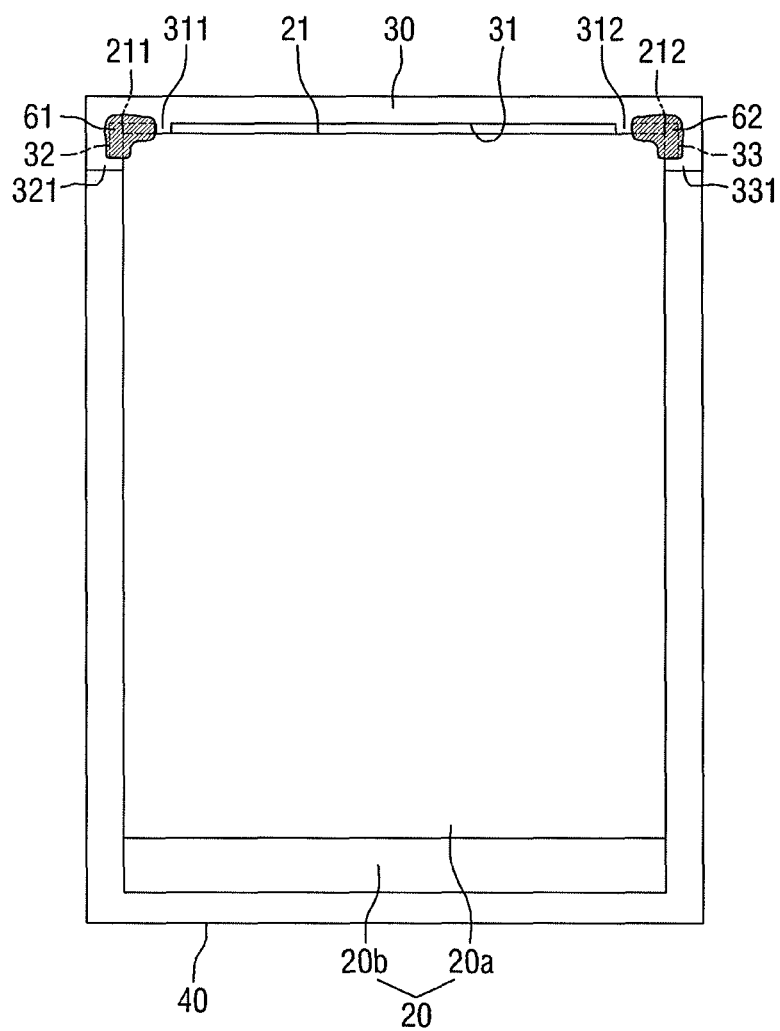
FIG. 8 is a plan view illustrating a liquid crystal panel, a guide member, a backlight unit, and conductive dots in a combined state according to still another embodiment.

Referring to FIGS. 7 and 8, a guide member 30b may include the first surface 31, a second surface 32, and a third surface 33. The second and third surfaces 32 and 33 may be connected to the first surface 31.

The liquid crystal panel 20 may further include a second side surface 22 that is connected to the first side surface 21 by the first short side 211. The second surface 32 may be disposed to face the second side surface 22. The guide member 30b may further include the second surface 32 to assist the connection between the first conductive dot 61 and the liquid crystal panel 20 in a region of the second side surface 22 that is adjacent to the first short side 211. Further, the second surface 32 may effectively prevent the peeling-off of the first conductive dot 61 by covering the first conductive dot 61 on the second side surface 22.

Similarly, the liquid crystal panel 20 may further include a third side surface 23 that is connected to the first side surface 21 by the second short side 212. The third surface 33 may be disposed to face the second side surface 23. The guide member 30b may further include the third surface 33 to assist the connection between the second conductive dot 62 and the liquid crystal panel 20 in a region of the third side surface 23 that is adjacent to the second short side 212. Further, the third surface 33 may effectively prevent the peeling-off of the second conductive dot 62 by covering the first conductive dot 62 on the third side surface 23.

The guide member 30b may further include the first and second projection portions 311 and 312, and may additionally include third and fourth projection portions 321 and 331.

The third projection portion 321 may project from the second surface 32 toward the second side surface 22 of the liquid crystal panel 20. The third projection portion 321 may be disposed to be adjacent to the first short side 211. The first conductive dot 61 may be disposed on the first surface 31 and the second surface 32 between the third projection portion 321 and the first projection portion 311 and may be combined with the liquid crystal panel 20. The third projection portion 321 may prevent the first conductive dot 61 from infiltrating into the inside of the second side surface 22 in the process of combining the first conductive dot 61 with the liquid crystal panel 20. Accordingly, the third projection portion 321 can prevent excessive extension of the first conductive dot 61 to decrease a potential for a short-circuit caused by the first conductive dot 61 of the liquid crystal panel 20.

The fourth projection portion 331 may project from the third surface 33 toward the third side surface 23 of the liquid crystal panel 20. The fourth projection portion 331 may be disposed to be adjacent to the second short side 212. The second conductive dot 62 may be disposed on the first surface 31 and the third surface 33 between the fourth projection portion 331 and the second projection portion 312, and may be combined with the liquid crystal panel 20. The fourth projection portion 331 may prevent the second conductive dot 62 from infiltrating, e.g., penetrating, into the inside of the third side surface 23 in the process of combining the second conductive dot 62 with the liquid crystal panel 20. Accordingly, the fourth projection portion 331 can prevent excessive extension of the second conductive dot 62 to decrease a potentially for a short-circuit caused by the second conductive dot 62 of the liquid crystal panel 20.

Figure 9:
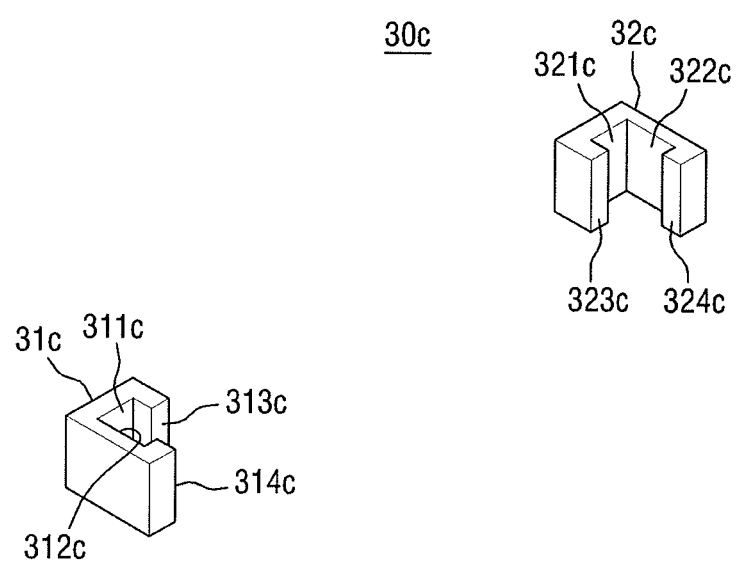
FIG. 9 is a perspective view of a guide member according to still another embodiment.

Hereinafter, referring to FIGS. 9 and 10, still another embodiment will be described. FIG. 9 is a perspective view of a guide member according to still another embodiment, and FIG. 10 is a plan view illustrating a liquid crystal panel, a guide member, a backlight unit, and conductive dots in a combined state according to the other embodiment.

Figure 10:
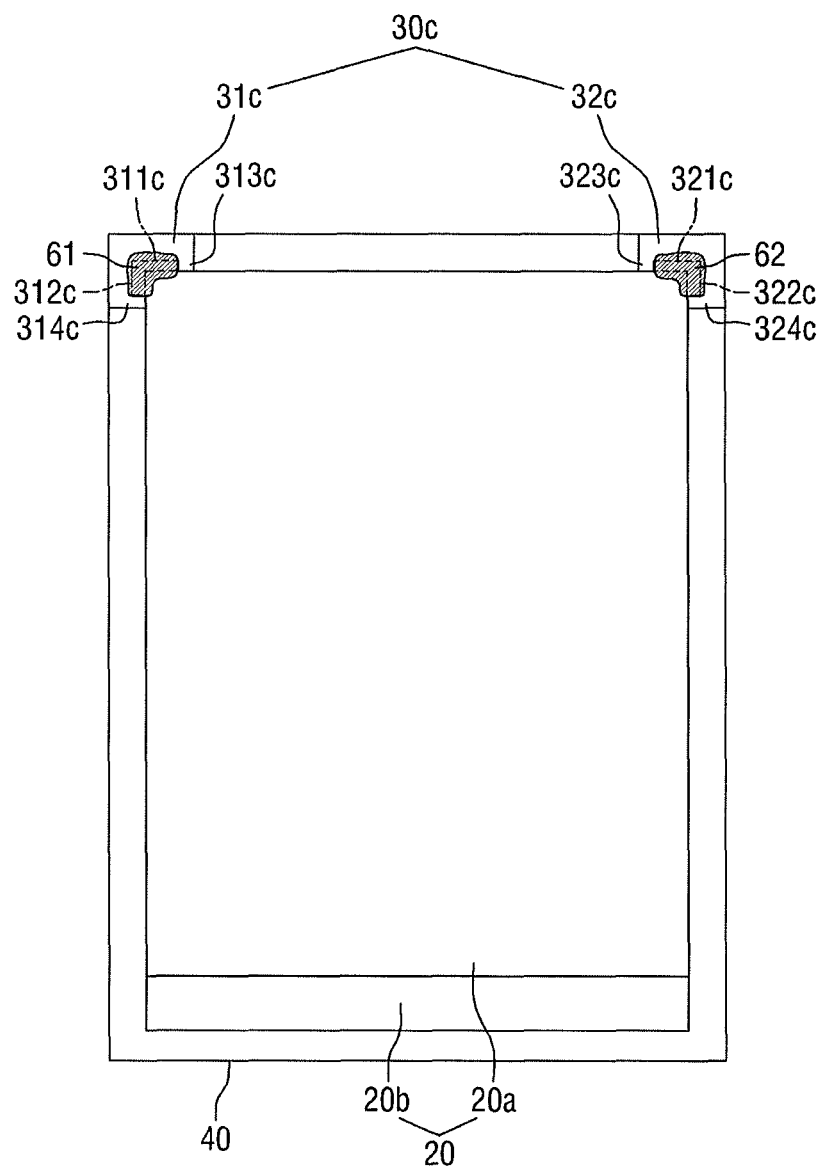
FIG. 10 is a plan view illustrating a liquid crystal panel, a guide member, a backlight unit, and conductive dots in a combined state according to still another embodiment.

Referring to FIGS. 9 and 10, a guide member 30c may include a first guide member 31c and a second guide member 32c.

The first guide member 31c may be disposed to be adjacent to the first short side 211. The first guide member 31c may include a first surface 311c that faces the first side surface 21 and a second surface 312c that faces the second side surface 22. The first conductive dot 61 may be disposed in a region that is adjacent to the corner where the first surface 311c and the second surface 312c are connected to each other, and may be connected to the liquid crystal panel 20. The first surface 311c and the second surface 312c may assist the connection between the first conductive dot 61 and the liquid crystal panel 20, and may prevent the peeling-off of the first conductive dot 61.

The first guide member 31c may further include a first projection portion 313c and a second projection portion 314c. The first projection portion 313c may project from the first surface 311c toward the first side surface 21, and the second projection portion 314c may project from the second surface 312c toward the second side surface 22. The first projection portion 313c and the second projection portion 314c can prevent excessive extension of the first conductive dot 61 to decrease the short-circuit inferiority that is caused by the first conductive dot 61 of the liquid crystal panel 20.

The second guide member 32c may be disposed to be adjacent to the second short side 212. The second guide member 32c may include a third surface 321c that faces the first side surface 21 and a fourth surface 322c that faces the third side surface 23. The second conductive dot 62 may be disposed in a region that is adjacent to the corner where the third surface 321c and the fourth surface 322c are connected to each other, and may be connected to the liquid crystal panel 20. The third surface 321c and the fourth surface 322c may assist the connection between the second conductive dot 62 and the liquid crystal panel 20, and may prevent the peeling-off of the second conductive dot 62.

The second guide member 32c may further include a third projection portion 323c and a fourth projection portion 324c. The third projection portion 323c may project from the third surface 321c toward the first side surface 21, and the fourth projection portion 324c may project from the fourth surface 322c toward the third side surface 23. The third projection portion 323c and the fourth projection portion 324c can prevent excessive extension of the second conductive dot 62, thereby decreasing a potential for a short-circuit caused by the second conductive dot 62 of the liquid crystal panel 20. In some embodiments, the liquid crystal display device 1 may include only one of the first guide member 31c and the second guide member 32c.

According to example embodiments, a liquid crystal display device may include conductive dots connecting a guide member to a lateral surface of the liquid crystal display panel. The conductive dots may extend along the entire lateral surface and may be electrically connected to a conductive layer on each of the substrates of the liquid crystal display panel. Accordingly, when the common and pixel electrodes of the liquid crystal display panel are on a same substrate, i.e., each of the electrodes is between the liquid crystal layer and the same substrate, the common electrode and a conductive layer on an opposite substrate may electrically contact the conducting dots to discharge potential static electricity through the conductive dots. As such, the display quality of the liquid crystal display device may be prevented from deteriorating due to static electricity. Further, as the conductive dots are between the guide member and the liquid crystal panel, they are structurally protected and prevented from being peeled off, and a potential for a short-circuit due to the conductive dots may be prevented.

In contrast, when both the common electrode and the pixel electrode are on a same substrate, e.g., the thin film transistor substrate, in a conventional liquid crystal display device, static electricity generated on an opposite substrate, e.g., on the color filter substrate, may not be discharged. The generated static electricity may exert an influence on the arrangement of the liquid crystal particles, and the display quality of the liquid crystal display device may deteriorate.

Although preferred embodiments of the example embodiments have been described for illustrative purposes, those skilled in the art will appreciate that various modifications, additions and substitutions are possible, without departing from the scope and spirit of the invention as disclosed in the accompanying claims.

What is claimed is:

1. A liquid crystal display device comprising:
a liquid crystal panel including a thin film transistor substrate and a color filter substrate that face each other;
a guide member adjacent to a first side surface of the liquid crystal panel; and
a plurality of conductive dots connected to the thin film transistor substrate, the color filter substrate, and the guide member, wherein the guide member includes at least one projection projecting toward the liquid crystal display panel and wherein each of the conductive dots overlaps an upper surface of the guide member and is outwardly protruded on the upper surface of the guide member, at least one of the conductive dots directly contacting the at least one projection,
wherein a side surface of the thin film transistor substrate and a side surface of the color filter substrate are coplanar and define the first side surface of the liquid crystal panel, the first side surface of the liquid crystal panel facing the guide member,
wherein the thin film transistor substrate and the color filter substrate are connected to the conductive dots in a region adjacent to at least one short side of the first side surface,
wherein the guide member includes a first surface, the first surface of the guide member facing the first side surface of the liquid crystal panel, and
wherein:
the at least one short side of the first side surface of the liquid crystal panel includes a first short side and a second short side opposite each other, and
the at least one projection includes a first projection portion adjacent to the first short side, the first projection portion projecting from the first surface of the guide member to the first side surface of the liquid crystal panel, wherein the first projection portion projects in a direction which crosses the first surface of the guide member and is between first and second ends of the first surface of the guide member.

2. The liquid crystal display device of claim 1, wherein the guide member further comprises a second projection portion adjacent to the second short side, the second projection portion projecting from the first surface of the guide member to the first side surface of the liquid crystal panel, wherein the second projection portion is between the first and second ends of the first surface of the guide member.

3. The liquid crystal display device of claim 2, wherein:
the liquid crystal panel further comprises a second side surface connected to the first side surface by the first short side, and
the guide member further comprises a second surface connected at an angle to the first surface and facing the second side surface.

4. The liquid crystal display device of claim 3, wherein the guide member further comprises a third projection portion adjacent to the first short side of the first side surface, the third projection portion projecting from the second surface of the guide member to the second side surface of the liquid crystal display device, wherein the third projection portion projects in a direction which crosses the second surface of the guide member.

5. The liquid crystal display device of claim 4, wherein:
the liquid crystal panel further comprises a third side surface connected to the first side surface by a second short side, and
the guide member further comprises a third surface connected at an angle to the first surface of the guide member and facing the third side surface.

6. The liquid crystal display device of claim 5, wherein the guide member further comprises a fourth projection portion adjacent to the second short side and projects from the third surface to the third side surface, wherein the fourth projection portion projects in a direction which crosses the third surface of the guide member.

7. A liquid crystal display device comprising:
a liquid crystal panel including a thin film transistor substrate and a color filter substrate facing each other;
a first guide member adjacent to a first short side of a first side surface of the liquid crystal panel; and
a plurality of first conductive dots connected to the thin film transistor substrate, the color filter substrate, and the first guide member, wherein each of the first conductive dots overlaps an upper surface of the first guide member and is outwardly protruded on the upper surface of the first guide member, wherein the first guide member includes at least one projection projecting toward the liquid crystal display panel, at least one of the first conductive dots directly contacting the at least one projection,
wherein the liquid crystal panel further comprises a second side surface connected to the first side surface by the first short side, the first guide member including a first surface that faces the first side surface and a second surface that faces the second side surface, and
wherein the at least one projection comprises:
a first projection portion which is adjacent to the first short side and projects from the first surface to the first side surface, the first projection portion projecting in a direction which crosses the first surface of the first guide member and is between first and second ends of the first surface of the first guide member; and
a second projection portion which is adjacent to the first short side and projects from the second surface to the second side surface.

8. The liquid crystal display device of claim 7, wherein a side surface of the thin film transistor substrate and a side surface of the color filter substrate are arranged on a same plane on the first side surface of the liquid crystal panel that faces the first guide member.

9. The liquid crystal display device of claim 7, further comprising:
a voltage source to apply a common voltage to the thin film transistor substrate, the thin film transistor substrate including a common voltage wiring exposed through the first side surface of the liquid crystal display panel, wherein:
the color filter substrate includes a color filter layer and a conductive layer connected to the color filter layer, and
the common voltage wiring and the conductive layer are in contact with the first conductive dots.

* * * * *